United States Patent [19]

Stojicic

[11] Patent Number: 4,768,344

[45] Date of Patent: Sep. 6, 1988

[54] CIRCULATORY EXPANDER FOR UTILIZING WASTE ENERGY OF A HEAT ENGINE

[76] Inventor: Tode Stojicic, P. Toljatija 62, 71000 Sarajevo, Yugoslavia

[21] Appl. No.: 15,648

[22] Filed: Feb. 17, 1987

[30] Foreign Application Priority Data

Feb. 17, 1986 [YU] Yugoslavia ............................ 235/86

[51] Int. Cl.⁴ .............................................. F02G 3/00
[52] U.S. Cl. ........................................ 60/624; 60/614
[58] Field of Search .................... 60/624, 614; 415/80, 415/87, 52

[56] References Cited

FOREIGN PATENT DOCUMENTS

| 2442755 | 5/1975 | Fed. Rep. of Germany | 415/80 |
| 5442 | 1/1980 | Japan | 415/80 |
| 51111 | 3/1984 | Japan | 60/624 |
| 608566 | 1/1979 | Switzerland | 60/624 |

Primary Examiner—Stephen F. Husar
Attorney, Agent, or Firm—Karl F. Ross; Herbert Dubno

[57] ABSTRACT

For conversion of the waste heat into the mechanical energy, in the proposed expander the parts of rotor and circulatory tube have the crucial importance. The rotor is a rotational symmetric hollow disc with the comparison chambers tangentially positioned on its peripheral wall. At the outlet ends of these chambers the de Laval nozzles with corrected divergent parts for supersonic outflow of the fluid flows causing the rotation of rotor, are placed in the position of maximum torque arm. The circulatory tube enables that the part of the fluid from the outlet tube is returned to the expander in the regulated way. The compression chambers and the circulatory system support the favorable conditions of flowing through the nozzles at the partial duties of the heat engines.

12 Claims, 4 Drawing Sheets

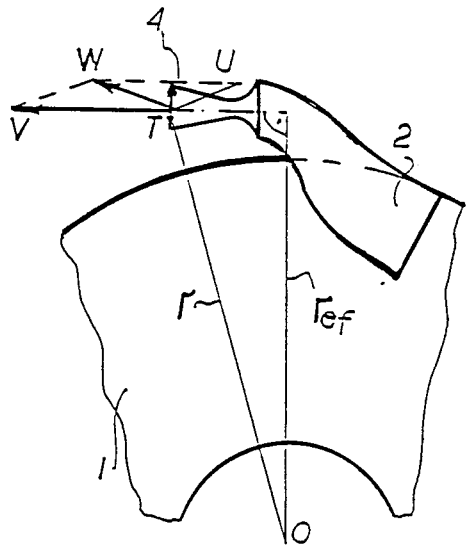
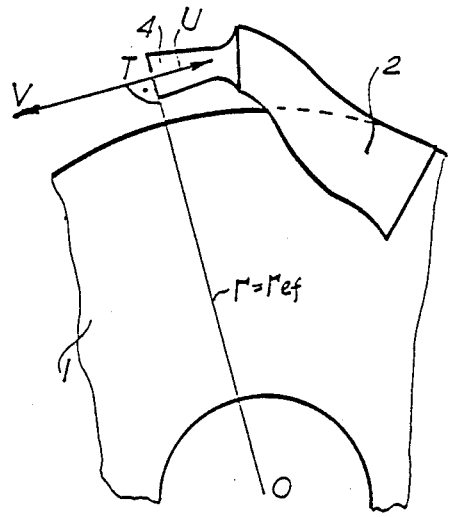
FIG.4  FIG.5
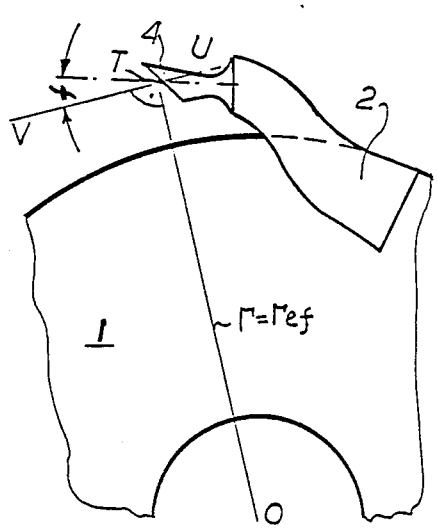
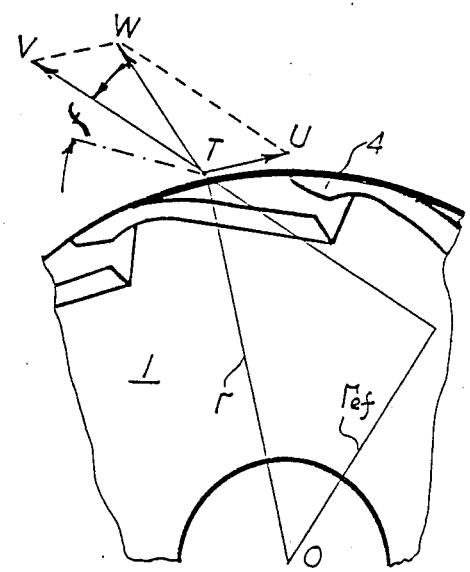
FIG.6  FIG.7

CIRCULATORY EXPANDER FOR UTILIZING WASTE ENERGY OF A HEAT ENGINE

FIELD OF THE INVENTION

The present invention relates to a circulatory expander which is to utilize thermal energy which would otherwise be lost in exhaust gases and in a heat engine cooling fluid and hereinafter referred to as waste heat. The heat engine can be an internal combusion engine, steam or gas blade-type turbine, propulsion engine, etc.

BACKGROUND OF THE INVENTION

Of the total thermal energy supplied to a heat engine, only a small part is efficiently utilized, while a major part is lost in exhaust gases and in the machine cooling fluid. The device of the invention enables conversion of this waste thermal energy into the mechanical energy which is transmitted to the heat engine shaft through a transmission type unit. In that way the engine efficiency can be considerably increased, that is the specific fuel consumption of a heat engine can be decreased.

Of the total thermal energy losses of the driving engines, the major part is lost through exhaust gas discharged into the environment. For that reason great effort is expended in order to utilize the exhaust gas energy.

In case of piston-type internal combustion engines, for a long time the exhaust gases energy has been utilized for turbocharging (gas expansion in a blade-type turbine driving a compressor for forced supply of air or an air and fuel mixture). That is a well-known engine forcing by means of which the engine power is considerably increased and the efficiency increased only insignificantly. In the case of propulsion engines, the interaction of a turbine and a compressor is regularly used in the operating cycle.

Recently there has been an intensive develoment of the blade-type turbine where the exhaust gas energy is converted into mechanical energy which is transmitted to the engine shaft (of the known investigations of the Cummins Company, USA etc.). In this way engine efficiency has been modestly increased so far. Apart from other deficiencies of the turbines, the unsolved problem is the regulation of the turbine at a variable gas flow with partial duty of the internal combustion engine. With steam piston engines, steam and gas turbines and similar engines, the subsequent expansion of exhaust gas for generation of additional mechanical energy on the engine shaft has not been used up to now.

OBJECTS OF THE INVENTION

It is an object of the invention to provide an improved heat engine, especially for the purpose of increasing its efficiency. This is desirable because of restricted availability of fuel and considerable pollution of the environment. Another object is to provide a considerable increase in efficiency by a suitable utilization of its waste energy, especially that being discharged in exhaust gases.

SUMMARY OF THE INVENTION

The invention comprises a circulatory expander for utilization of waste energy of a heat engine and having a rotor of a full symmetry, compression chambers tangentially positioned on the peripheral rotor wall, nozzles at outlet ends of the compression chambers through which the jets causing rotor rotation flow out at supersonic speed, a circulatory tube for circulation of exhaust gases and hot air and for regulation of fluid flow through nozzles, elements which enable postcombustion of the unburned fuel and air mixture, ceramic liners on working areas and other necessary parts. The high efficiency of the machine of the invention is enabled at the supersonic flow speed by increased and regulated mass of fluid flow through nozzles and by using a maximum possible moment arm. The compression chambers, fluid circulatory system for fluid recirculation and forms of outlet nozzle ends provide for the supersonic fluid flow. Preliminary calculations show that by coupling the device of the invention to the internal combustion engine, the efficiency can be increased by 30% on average. At the same time, the stationary and dynamic characteristics of the engine can be considerably improved, together with its uniformity of revolution, the noise level and pollution of the environment can be reduced.

BRIEF DESCRIPTION OF THE DRAWING

For the purpose of easier description of the invention and its operation, reference may be had to the drawing attached hereto in which:

FIG. 4 is a diagram showing a tangential position of nozzle on the rotor periphery;

FIG. 5 is a diagram showing the tangential position of outlet end of a nozzle on the rotor periphery;

FIG. 6 is a diagram of the nozzle with an inclined outlet end; and

FIG. 7 is a diagrammatic section of the nozzles on the rotor peripheral wall.

SPECIFIC DESCRIPTION

Figure 1:
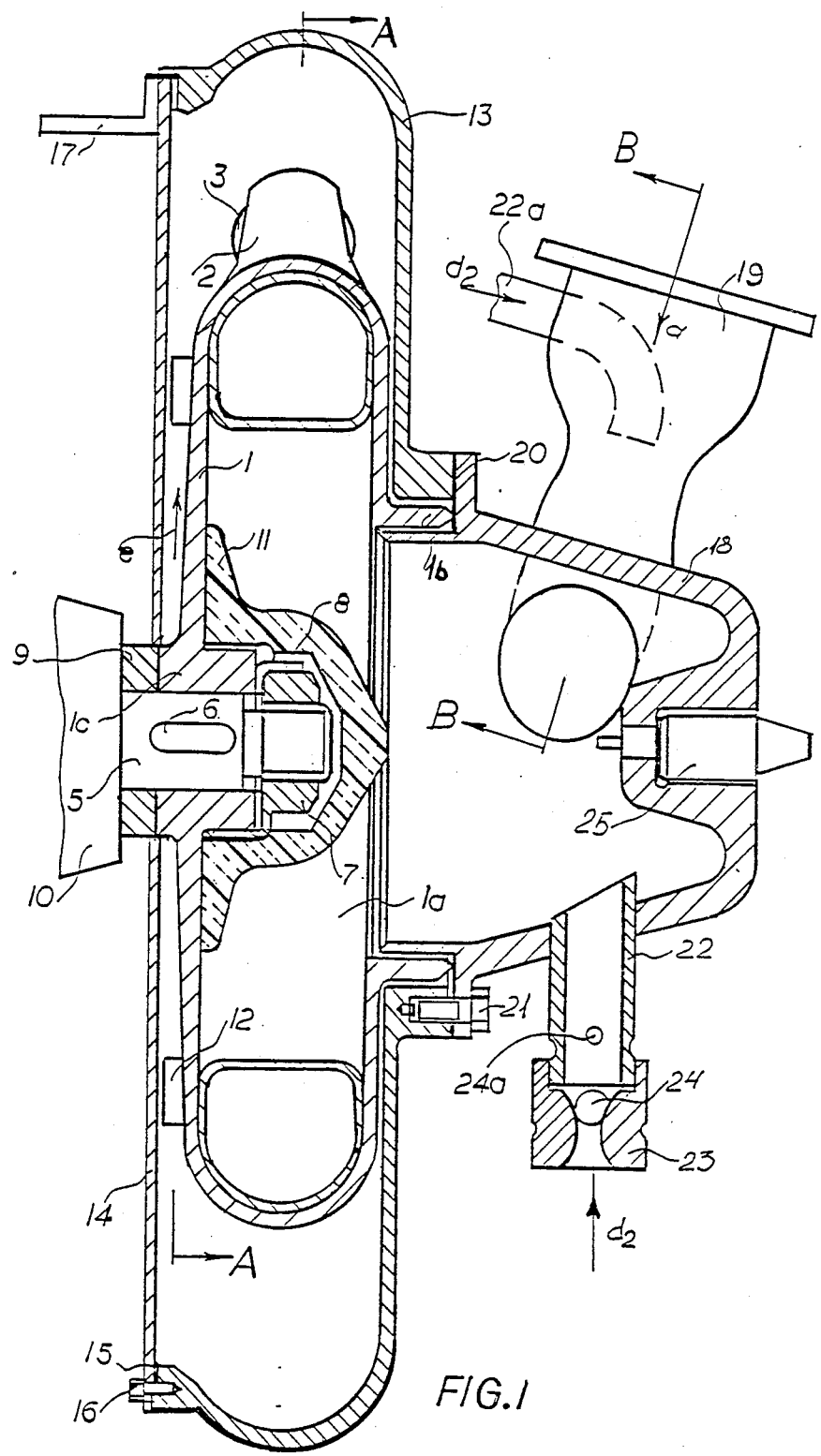
FIG. 1 is an axial cross-sectional view through an expander taken along the line C—C of FIG. 3.

The rotor 1 has the form of a rotationally symmetrically disc. As can be seen from FIGS. 1 and 2, the rotor 1 is formed with a rotationally symmetrical hollow 1a, with one large sleeve 1b forming a portion of a large diameter axial bore at the inlet side thereof and forming an inlet to the hollow of the rotor also forming a small boss 1c, with a small bore at the opposite axial side of the rotor.

On the periphery of rotor 1 the compressor chambers 2 are disposed tangentially with the inlet parts thereof placed in the internal side and the outlet parts located externally of the rotor peripheral wall. On the outlet ends of the compression chambers 2 nozzles 4 are placed, the nozzles having the corrected form of de Laval or Venturi nozzles. The outlet ends of nozzles 4 are located tangentially to an imaginary circle centered on the axis of the rotor.

Figure 2:
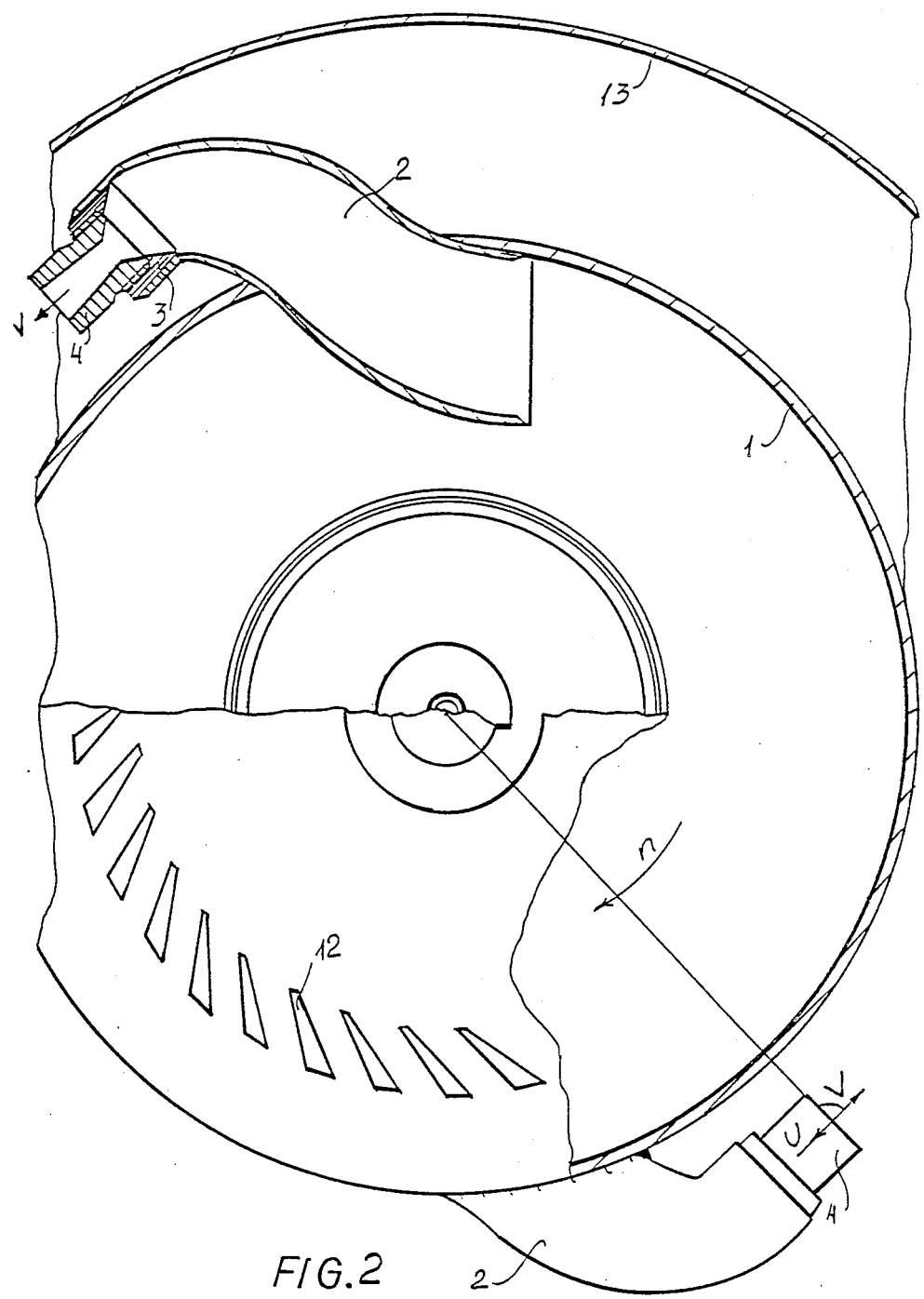
FIG. 2 is a radial cross-sectional view through an expander taken along the line A—A of FIG. 1, showing only a part of the housing which is rotationally symmetrical.

At the designated position of the nozzle 4 in FIG. 2 the collinearity of vectors of rotor peripheral speed U and vectors of jet speed V is reached. The nozzles 4 are fixed by screws on the nozzle support 3. The compression chambers 2 and the nozzles 4 are mounted symmetrically on the rotor periphery and preferably an even number of compressor chambers and nozzles are used.

The rotor is mounted on the rotor shaft 5, fixed by the key 6 and provided with the nut 7 and the nut-retaining circlip 8. Instead of the key 6 some other joint can be used (e.g. a splined shaft, screw connection, etc.).

Between the rotor shaft 5 and heat machine shaft it is necessary to place an transmission unit for a speed multiplication of the rotor shaft the transmission usually having a transmission ratio from 2 to 10. The transmission can have gears or be of the belt type, etc.). For engine with high revolution speeds and where a larger diameter of the rotor 1 can be used, the expander can be positioned directly on one shaft end of the heat engine.

The position of rotor 1 is defined by the spacer ring 9 to suit the bearing housing 10. On the small boss of the rotor 1 the thermal insulating cap 11 is fixed by means of threads in order to reduce heat transmission to the connecting parts of rotor with shaft.

On the wall of the rotor 1 there are blades 12 for radial air flow (arrow e). This enables cooling and prevents passing of gases from the housing 13 near the housing cover 14. The housing cover 14 is fixed by screws 16 over the cover seals 15. The housing 13 is provided with an axially extending large boss of relatively large diameter in which the large sleeve portion of the hollow rotor 1 is journaled. The housing 13 and housing cover 14 are fixed to the engine block by supports 17, usually three in number.

An inlet tube 19 is located tangentially on the inlet chamber 18 which is divergent toward the rotor chamber with which it communicates, being fixed on the lateral housing 13 over its opening by the screws 21. The sealing ring 20 has a circular groove for receiving the conical part of the large inlet sleeve 1b of the rotor 1. Hence, gas flow from the inlet chamber 18 away from the opening of the housing 13 is prevented.

In the inlet divergent chamber 18 the end of circulatory tube 22 is introduced with one-way valve 23. Movement of the valve ball 24 is restricted by the pine 24a. Alternatively the end of the circulatory tube 22a may be placed in the narrow part of the inlet tube 19.

In the wall of the inlet divergent chamber 18 the spark plug or any heater plug 25 is mounted to enable the post-combustion of the fuel mixture part from exhaust gases. This is important for application of the expander to a two-stroke carburetor engine.

The outlet housing tube 34 is mounted tangentially on the periphery of the housing 13 with edge 26a of the tube projecting into the housing in order to direct the gases flow. In the convergent part of the outlet tube 26 the circulatory tube funnel 27 is located.

When the rotor 1 is cast, the compression chambers 2 can be made as integral part of its peripheral wall, or the machined compression chambers 2 can be cast into the rotor 1 wall.

Similarly the previously machined nozzles 4 can be cast into the outlet part of compression chamber 2. The nozzles 4 may be curvilinear with a rotationally symmetrical cross section. Upon casting of the housing 13, the outlet tube 26 can be made as an integral part of its peripheral wall. Then the circulatory tube funnel 27 and the hot air tube 35 can be cast into the tube 26. Similarly the inlet tube 19 can be made during casting the inlet divergent chamber 18. The surfaces of parts 1, 2, 4, 13, 18, 22 and 27 past which the fluid flows, should be smooth.

Figure 3:
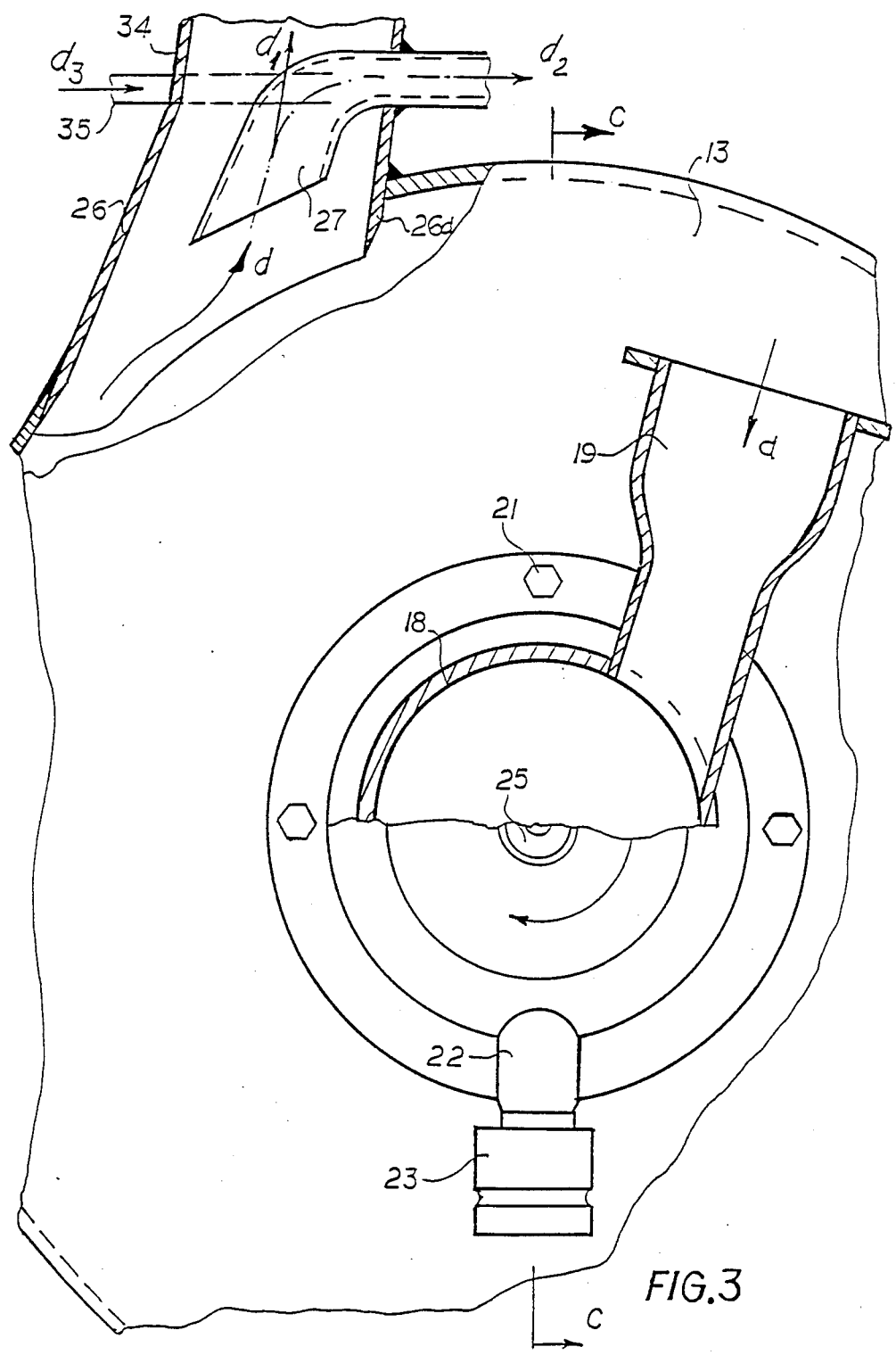
FIG. 3 is a cross section taken along the line B—B of FIG. 1 and a partial cross section of the outlet tube with parts for fluid and air circulation.

The operation of the device can be explained with reference to FIGS. 1, 2 and 3. From the exhaust pipe of the heat engine the gas (arrow a) is introduced through the inlet tube 19 and the inlet divergent chamber 18 into the rotationally symmetrical hollow 1a of the rotor 1 with rotation.

At lower rotary speeds of the rotor 1, the inlet tube 19 can be placed so that gases rotate in the opposite direction from the rotor rotation. At higher speeds of the rotor 1 an opposite position of the outlet tubes 19 on the inlet divergent chamber 18 wall is recommended in order to obtain the same rotation direction of gases and rotor.

As the gas flows into the chamber 18 and rotor 1, the gas pressure is increased due to the kinetic energy of the gas. Some increase also occurs by the effect of centrifugal force. More considerable pressure increase occurs in tangentially positioned compression chambers 2. The flow cross sections of the compression chambers 2 should be much larger than in the nozzles 4 (about 3 to 10 times) to ensure a jet outflow at supersonic speed corresponding to (total gas expansion), the Laval and Venturi nozzles are anticipated in the expander. In these nozzles a correction of the divergent part profile can be provided in order to eliminate adverse effects of shock waves that are unavoidable at the supersonic flows.

At the expander the position of nozzle 4 is arranged at the ends of the compression chambers 2 so that the outlet ends of the nozzles 4 are tangential to a circle which is during its rotation circumscribed by the ends centers as can be seen from FIG. 2 with this position of the nozzles 4, the maximum torque arm is achieved.

FIGS. 4, 5, 6 and 7 show various nozzle arrangements.

FIG. 4 shows a tangential position of the nozzle 4. It is obvious that in the center of the nozzle outlet end T, the vector of jet velocity V is not co-linear with the vector of the peripheral velocity U, so that the radius of trust forces of the jet is $r_{ef}$ which is smaller than the maximum possible radius r. For this reason, the direction of vector of the relative velocity of jet W is unfavorable. In this way the flow resistances are stronger (strong jet impact against the housing wall), and the fluid pressure in the housing 13 is greater. These deficiencies are greater in some solutions in which the nozzles are formed directly in the peripheral wall of the rotor 1, as for example in the FIG. 7. The system where in the center T of the nozzle outlet end the co-linearity of the vectors U, V and W is achieved, is shown in FIGS. 5 and 6. According to FIG. 5, the stated condition can be met by the form and direction of the outlet end of the compression chamber 2. The same result can be obtained by using an accurate nozzle arranged in such way that its arc axis conicides with the circle or rotation of the center T outlet end of the nozzle 4.

In FIG. 6 a system with a sloped or inclined outlet end of the nozzle 4 is shown, disposed so that its shortest edge is directed to the center of rotation O. The known digression of jet by angle f towards the center is produced in sloped section. By choosing the position of the nozzle end and of the angle of sloped section, the indicated co-linearity of the U, V and W vectors can be attained.

At high velocities of the jets V, the gases rotate past the housing periphery in the form of a ring in the opposite direction from the rotor rotation. For this reason the outlet housing tube 34 is placed tangentially on the housing 13 periphery in the opposite direction of rotor rotation. The projecting edge 26a (directing "pocket") ensures a stronger digression of gases from the flow d.

If the nozzle is dimensioned for maximum mass flow of fluids, then with partial duty of the heat engine the flow conditions will be changed and expansion in the nozzles will not be complete. For this reason, I regulate expander by the introduction or circulation of a part of gases after expansion in the nozzles.

The circulatory path consists of: funnel 27 in the convergent part of the outlet tube 26, circulatory tube 22 and the valve 23. The elements 27 and 23 are connected by a circulatory tube.

Instead of the ball valve 24, a flap valve can be taken. The pressure in the funnel 27 is increased due to the kinetic force of the flow d, especially as the jets approach. With this type of regulation of the nozzle flow, the calculation should be made at the maximum gases flow from the heat engine, taking into consideration the gases from the flow $d_2$ returning to the inlet divergent chamber 18.

The flow $d_2$ is automatically adjusted under the influence of the compression chambers 2. Namely, at partial duty of the heat engine, the pressure in the chamber 18 will be reduced, resulting in increase of the mass flow $d_2$ as well as the total mass flow through the nozzles. Hence, the regulation of the flow in the nozzles is achieved by changing of the circulation rate. With engines having a wide speed range of operation, relatively high rates of circulation should be taken into account.

In some applications of the expander of the invention, instead of the circulatory tube 22, the end of the circulatory tube 22a can be introduced into that part of the inlet tube 19 which is narrowed in the form of the Venturi nozzle, and in that way the ejection effect of the gas flow can be used. In some applications the one-way valve 23 may be omitted. The hot air (arrow $d_3$) may be introduced into the circulatory tube by means of the tube 35. Such air is usually taken from the heat machine cooling system and by the tube 35 is led around or inside the outlet tube 34 because of the additional heating from the flow $D_1$. This is very important for a two-stroke carburetor engine.

Instead of the blades 12 (FIG. 1) on the lateral wall of the rotor 1, sealing between the rotor boss and the housing cover 14 can be achieved by means metal seals.

In order to increase the expander efficiency, liners made of "ceramics" can be fabricated on the internal areas of the rotor 1, chamber 2, inlet chamber 18, tube 19 and circulatory tube 22. For the same purpose it is recommended that such parts should be completely made of "ceramics" or of other materials having heat transmission coefficients less than those of usual conventional materials.

What is claimed:

1. A circulatory expander for utilizing waste energy of a heat engine, comprising:
   a generally circular housing having an axis and a circular peripheral wall;
   an outlet tube extending tangential to said peripheral wall and opening into said housing, said outlet tube having a convergent portion converging away from said housing;
   at least one circulatory tube funnel in said outlet tube, said tube funnel having a convergent inlet part opening towards said housing;
   a rotor rotatable about said axis in said housing and having an internal hollow space, said rotor being formed by two axially spaced walls generally perpendicular to said axis, one of said axially spaced walls being formed with a large diameter axial bore forming an inlet to said hollow space, the other of said axially spaced walls having a boss with a bore the diameter of which is less than that of said large diameter bore, said rotor having a peripheral wall;
   a rotor shaft extending along said axis for transmitting a driving torque to a heat engine;
   means, including said boss, for connecting said rotor shaft to said heat engine;
   means forming a plurality of compression chambers located tangentially at said peripheral wall of said rotor, each of said compression chambers being formed with an inlet opening open toward said internal space and in a direction of rotation of said rotor and with an outlet opening having a smaller diameter than the respective inlet opening, said outlet opening being open outwardly of the peripheral wall of said rotor and oriented in a direction opposite the direction of rotation;
   respective de Laval nozzles at said outlet openings for generating an outward fluid flow with a supersonic speed causing said rotation of said rotor about said axis in said direction of rotation;
   means forming an inlet chamber fixed on said housing along said axis and having an annular wall diverging towards said large diameter bore, said inlet chamber opening into said internal space through said large chamber bore;
   an inlet tube located tangential to said annular wall and opening therethrough into said inlet chamber, said tube connecting an exhause pipe of said heat engine to the interior of said inlet chamber; and
   a circulatory tube connecting said circulatory tube funnel with said inlet chamber.

2. The circulatory expander defined in claim 1 wherein said compression chambers are formed in one piece with said peripheral wall of said rotor.

3. The circulatory expander defined in claim 1 wherein said circulatory tube is provided with a Venturi nozzle.

4. The circulatory expander defined in claim 1 wherein said nozzles are curvilinear.

5. The circulatory expander defined in claim 1 wherein said nozzles are separate from but attached to said compression chambers and said nozzles have cross sections which vary along their axes.

6. The circulatory expander defined in claim 1 wherein said rotor and a shaft of said heat engine are connected directly to each other.

7. The circulatory expander defined in claim 1 wherein said rotor is connected by a transmission to said shaft.

8. The circulatory expander defined in claim 1 wherein said rotor, and said compression, and inlet chambers and said inlet and circulatory tubes are made of a material having a low heat transfer coefficient.

9. The expander defined in claim 1 wherein said divergent chamber has a heater plug in said inlet chamber for postcombustion of unburnt products in exhaust gas introduced into said inlet chamber.

10. The circulatory expander defined in claim 1 wherein said circulatory tube opens into said inlet chamber and is provided with a one way valve permitting fluid recirculation.

11. The circulatory expander defined in claim 1 wherein said circulatory tube opens into said inlet tube.

12. The circulatory expander defined in claim 1, further comprising a hot air tube opening into said circulatory tube funnel.

* * * * *